Sept. 10, 1963 J. W. SKERRITT 3,103,596
EXCLUSIVE OR CIRCUIT
Filed June 30, 1958
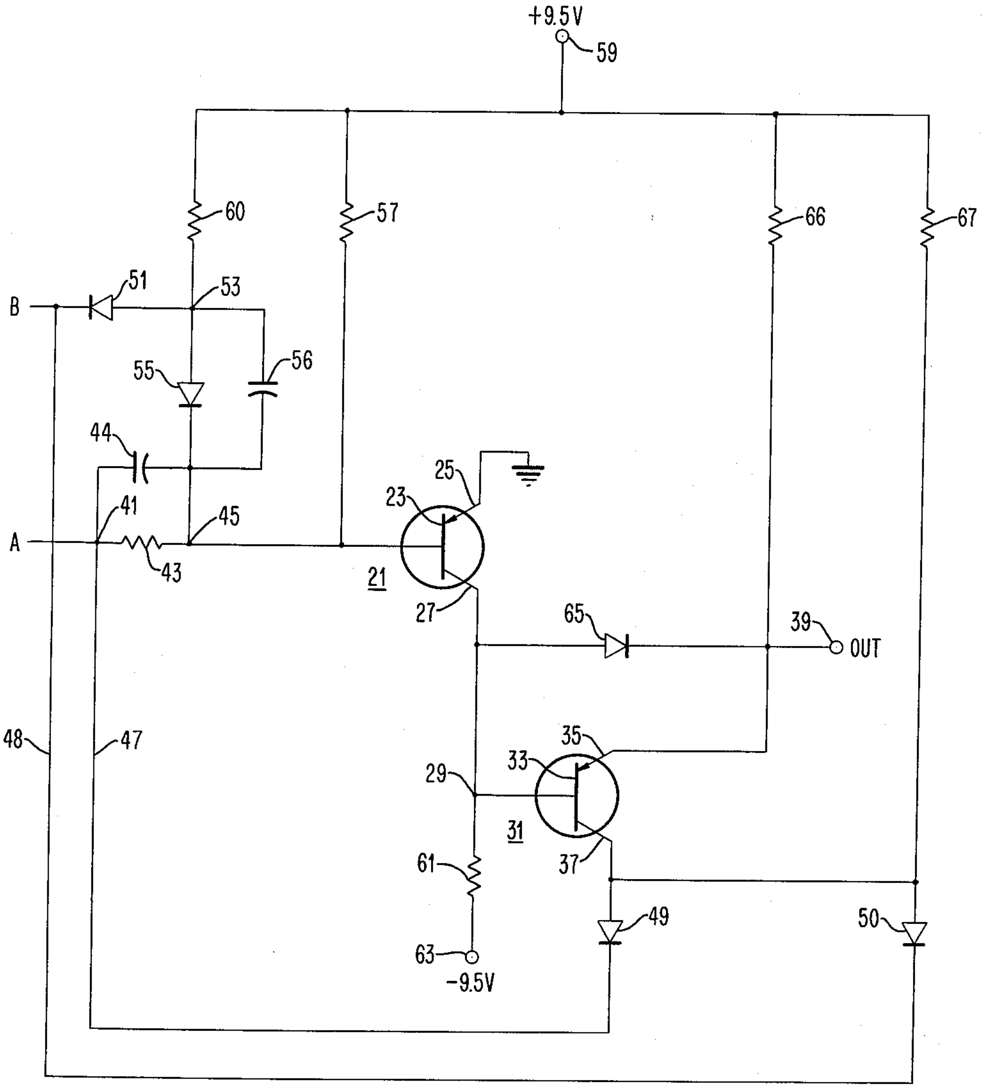
INVENTOR.
JOHN W. SKERRITT
BY Joseph J. Connerton
ATTORNEY United States Patent Office 3,103,596
Patented Sept. 10, 1963

3,103,596
EXCLUSIVE OR CIRCUIT

John W. Skerritt, Kingston, N.Y., assignor to International Business Machines Corporation, New York, N.Y., a corporation of New York Filed June 30, 1958, Ser. No. 745,391
3 Claims. (Cl. 307—88.5)

This invention is directed to electric circuits and more particularly to circuits of the type known as logical circuits.

A logical circuit may be defined as a circuit having a plurality of inputs and a single output which responds to distinctive combinations or permutations of its input signals, known as variables, to produce an output signal identifying the resultant of the logical function, thereby providing a means for logical discrimination among the combinations of signals. Signals of other combinations than that for which the circuit is designed produce no effect at the output.

While logical circuits have varied applications, they are extensively used in switching and computer circuits for the internal routing of information. Such information in the form of electrical signals is generally guided through the desired circuit paths by means of logical or switching circuits. Depending on the logic utilized by the associated apparatus, logical circuits may be positive or negative, the type logic being identified by the polarity of the input variables. Using positive logic, positive signals are considered pertinent; using negative logic, negative signals are considered pertinent.

Certain basic logical circuits, such as And, Or and Inverter circuits, for example, are well-known and widely employed in the art to provide designated fundamental logical expressions. Initially, more complex logical functions were provided by distinctive combinations of the above-noted basic logical circuits. One specific type of a more complex logical circuit is known as an Exclusive Or circuit, and may be defined as a circuit which provides an output signal whenever an input signal is received at any single one of its inputs, but not when input pulses are absent or received simultaneously at a plurality of inputs. Considering a circuit having input variables A and B, the logical Exclusive Or function is identified by the expression $A\overline{B}+\overline{A}B$. While the Exclusive Or circuit is used for information transmission within the computer itself, it is also widely employed in error checking circuitry associated with computers.

While an Exclusive Or logical function may be achieved by certain distinctive combinations of the heretofore enumerated basic logical circuits, such modifications may be unsatisfactory, particularly in high speed computers, due to the time delay in propagating a signal through the component circuits. A second disadvantage of this arrangement is that a considerable amount of equipment is required to achieve the desired logical relationship.

The foregoing logical circuits are known in the prior art in the form of vacuum tube circuits or semiconductor diodes. A two input logical And circuit, for example, may comprise a pentode and associated circuitry whereby coincident pulsing of the control and screen grid causes conduction of the tube indicative of the logical resultant. Vacuum tube circuits, however, have limitations in required signal, speed, power dissipation, etc. Diode logical circuits, on the other hand, may provide considerable distortion to an input signal and primarily due to the wide variation in manufacturing tolerances, it is extremely difficult to maintain fixed voltage levels.

Because of their compatibility with minimum space requirements, low power consumption and ability to function at high speed with very low signal levels, transistors are being employed on an ever increasing scale in computer circuitry. Due to the variation between transistors and prior art devices, particularly in current and potential characteristics, transistors cannot generally be directly substituted for prior art devices and logic circuits must therefore be specifically designed for a particular set of parameters.

The present invention is directed toward a binary logical Exclusive Or circuit utilizing semiconductors. The circuit employs a unique configuration of transistors and diodes to distinguish between four possible combinations of the input variables and provide an output signal indicative of the logical resultant. While the use of transistors to perform basic logical functions is known, the present invention provides a relatively simple circuit to solve a relatively complex logical function. The unique circuit configuration permits very high speed operation at low signal levels, and provides a circuit which is compatible with auxiliary equipment utilizing transistors.

Accordingly, an object of the present invention is to provide a novel switching circuit utilizing semiconductors.

Another object of the present invention is to provide an improved logical circuit of the Exclusive Or type.

Still another object of the present invention is to provide a logical Exclusive Or circuit utilizing semiconductors.

A further object of the invention is to provide a high-speed logical circuit utilizing transistors.

Another object of the present invention is to provide an improved logical circuit of the Exclusive Or type which operates on negative logic and which is adapted to operate on extremely low signal levels.

Another and still further object of the present invention is to provide a logical Exclusive Or circuit wherein a component transistor is utilized as a logical And circuit by applying current simultaneously to its emitter and collector.

Other objects of the invention will be pointed out in the following description and claims and illustrated in the accompanying drawings, which disclose, by way of example, the principle of the invention and the best mode, which has been contemplated, of applying that principle.

In the drawing, the single FIGURE illustrates in schematic form a preferred embodiment of the present invention.

Referring now to the drawing, there is illustrated a first transistor 21 having a base 23, an emitter 25 and a collector 27. Collector 27 is connected via terminal 29 to the base 33 of a second transistor 31 having an emitter 35 and a collector 37. An output terminal 39 is connected to emitter 35. To simplify the ensuing description with respect to logical expressions, the inputs are labeled A and B on the drawings and so designated hereinafter. Input A is connected via terminal 41 and parallel connected resistor 43, capacitor 44 and terminal 45 to the base 23 of transistor 21, and from terminal 41 via conductor 47 and diode 49 to collector 37 of transistor 31. Input B is connected through diode 51, terminal 53, diode 55 and terminal 45 to the base of transistor 21. Capacitor 56 is connected in parallel with diode 55. Diodes 51 and 55 and resistors 43 and 60 are so interconnected as to provide the logical And function at terminal 45. Resistor 57, connected between the positive supply terminal 59 and base 23, is a temperature compensating resistor, while resistor 61 is connected between collector 27 and the negative supply terminal 63. Diode 65 is connected between the collector 27 of transistor 21 and the emitter 35 of transistor 21, emitter 35 in turn being connected to output terminal 39. Input terminal B is connected through conductor 48 and diode 50 to collector 37, while resistors 66 and 67 are interconnected between positive supply terminal 59 and emitter 35 and collector 37 respectively.

The mode of operation of the present invention will be initially described under the four possible input conditions to better illustrate the manner in which the subject invention distinguishes between the various combinations of inputs. In the ensuing description, the terms "up" and "down" are used to designate the relative levels of the input signals while the terms "on" and "off" are used to designate the conduction states of the transistors. Since the present invention is designed to function with negative logic, the "down" level of the variables is designated A B while the "up" level of the corresponding variables is designated $\overline{A}$ $\overline{B}$. The operation of the logical device under the four possible combinations AB, $\overline{AB}$, A$\overline{B}$ and $\overline{A}$B will now be described, the latter two combinations defining the Exclusive Or relationship.

Under the first assumed condition AB, both A and B are down, and current flows from positive supply terminal 59 through resistor 60 and diode 51 to B source. Since diode 51 is forward biased and the drop thereacross is negligible, the potential at terminal 53 drops to approximately the B input level. Since the down signal is applied to base 23 from input source A, transistor 21 is turned on and current flows from the base 23 through resistor 43 to A source. Since the emitter-base drop of transistor 21 under saturation is extremely low, the base potential of transistor 21 is a few tenths of a volt below the ground potential of emitter 25. Under these conditions, diode 55 is back biased in the high impedance region, transistor 21 is saturated and the signal level at collector 27 is slightly below the potential at emitter 25. With transistor 21 in saturation, current flows from the grounded emitter through collector 27 and resistor 61 to the negative supply terminal 63. Due to the high impedance of resistor 57, a small current flows from the positive supply terminal 59 through resistors 57 and 43 to the A source. Resistor 57 supplies the off saturation collector current ($I_{co}$) to the base 23 of transistor 21 when transistor 21 is turned off.

With transistor 21 saturated, the collector 27 is "up" and this signal is applied to the base 33 of transistor 31. Transistor 31 is conducting in the active region with its emitter 35 and output terminal 39 at a potential slightly more positive, on a relative order of several tenths of a volt, than its base 33. Current flows from the positive supply terminal 59 through resistor 67 and the parallel combination of diodes 49 and 50 to the A and B sources respectively, and thereby maintains the collector 37 of transistor 31, connected to the anodes of diodes 49 and 50, slightly more positive than the A and B input levels by the forward drop of diodes 49 and 50. Current also flows from the positive supply terminal 59 through resistor 66 into the emitter 35 of transistor 31, where it divides into two paths, most of the current flowing through the collector, a small proportion flowing through the base. Because the transistor is conducting in the active region, and diode 65 is connected effectively between the base and emitter, diode 65 is back biased. Under the above prescribed conditions, transistor 31 functions as an emitter follower to provide an "up" signal from emitter 35 to output terminal 39. The AB condition above-described represents the only input combination where transistor 21 is in saturation and transistor 31 operates in the active region.

Under the second assumed conditions $\overline{AB}$ where both inputs are "up," the emitter base junction of transistor 21 is back biased due to the voltage divider action of resistors 43 and 57 connected between the A input and positive supply terminal 59. Current flow through this path establishes a positive potential at terminal 45, which, being connected to the base 23, maintains transistor 21 cut off. Current also flows from the positive supply terminal 59 through resistor 67 and the parallel combination of diodes 49 and 50 to the A and B sources respectively. This current flow maintains the anodes of diodes 49 and 50 and the collector 37 of transistor 31 at a potential slightly more positive than the A and B levels by the forward voltage drop across diodes 49 and 50. Current also flows from positive supply 59 through resistor 67 and the collector-base junction of transistor 31 through resistor 61 to the negative supply terminal 63. Another current path from the positive supply terminal 59 is through resistor 66, the emitter-base junction of transistor 31, and through resistor 61 to the negative supply terminal 63. These emitter to base and collector to base currents cause the base 33 potential to rise to a value more negative than the collector 37 potential by the drop across the collector base junction. The emitter 35 and output terminal 39 are at the up level and at a potential more positive than the base 33 potential by the drop across the emitter base junction. Transistor 31 in this condition functions as two forward biased diodes to produce the desired up level at the emitter terminal 35. Thus, though the operation under this is dissimilar than AB heretofore described, the resultant output signal is the same.

Under the third possible condition A$\overline{B}$ where the input A is "down" and input B is "up," current flows from the positive supply terminal 59 through resistor 60 and diode 51 to the B source, providing a potential at terminal 53 slightly above the "up" level of the B source. The current through resistor 60 divides, part of this current flowing through diode 55, and resistor 43 to the A supply. Since the drop across diode 55 is not sufficient to allow the emitter base junction of transistor 21 to become forward biased, no base current is drawn from transistor 21 and transistor 21 remains cut off. As previously described under the first condition AB, with the A input down, current flow through diode 49 produces a potential at collector 37 of transistor 31 slightly more positive than the A input. Current flows from the positive supply terminal 59 through resistor 66 into the emitter 35 of transistor 31. This emitter current divides between the collector 37 and the base 33. That portion of the emitter current that flows out of base 33 flows to the negative supply terminal 63 through resistor 61. Transistor 31 is now in saturation and since its collector potential is "down," the resultant signal at emitter 35 and output terminal 39 is also "down." Thus the Exclusive Or expression A$\overline{B}$ is identified by a "down" output signal.

Under the fourth possible condition $\overline{A}$B where input B is "down" and input A is "up," current now flows from the positive supply terminal 59 through resistor 60 and diode 51 to the B source, thereby maintaining the voltage at terminal 53 slightly more positive than the "down" level of the B source. The voltage divider action of resistors 57 and 43 connected between the positive terminal 59 and the A source establishes a potential at the base 23 of transistor 21 more positive than ground. Diode 55 is thus back biased and transistor 21 is cut off. As previously described under the AB condition, current flow through diode 50 produces a "down" level at the collector 37 of transistor 31. When transistor 31 is saturated in the above-described manner, a "down" level is produced at the output terminal 39. Thus the Exclusive Or expression $\overline{A}$B is identified by a "down" output signal.

The above described sequence of operation of the subject device will be briefly summarized under the four possible combinations of input variables. Under the AB condition, transistor 21 is turned on and inverts the down signal applied to its base to produce an "up" level at collector 27 which is applied to the base of transistor 31. Transistor 31 is caused to operate in the active region and functions as an emitter follower to produce an "up" output signal indicating lack of the Exclusive Or relationship.

Under the $\overline{AB}$ condition, transistor 21 is cut off. Diodes 49 and 50 function as a logical Or circuit to apply an "up" level to collector 37 of transistor 31. Current is then caused to flow through both the emitter-base junction and the collector base junction to saturate transistor 31, thereby producing an "up" signal at emitter 35 and output terminal 39. Thus transistor 31 is caused to function as a logical And circuit only under the condition where both input variables are "up."

Under the $\overline{A}B$ condition, transistor 21 is cut off by voltage divider action of resistors 43 and 57. Under the $A\overline{B}$ condition, current flow through resistor 60 and diode 51 to the B input produces a potential slightly positive with respect to the B input at the anode of diode 55. Since this potential is more positive than that at emitter 25, current to the A input is supplied by diode 55 rather than transistor 21, and transistor 21 is thus maintained cut off. Under both conditions, current flow from the positive potential source through the diode 49 or 50 associated with the down input produces a "down" signal at collector 37 and transistor 31 is driven into saturation by conventional emitter follower action to produce a "down" output at the emitter 35 and output terminal 39.

While the voltage levels employed in the preferred embodiment and described as "up" and "down" were ground and −3 volts, such levels are obviously a matter of design and could be shifted upward or downward as desired. By substituting positive for negative logic, the reciprocal of the Exclusive Or function, "If and Only If" is achieved.

Circuit values employed in the preferred embodiment herein described are tabulated below:

| | | |
|---|---|---|
| Resistor: | | |
| 43 | ohms | 1.8K |
| 57 | do | 100K |
| 60 | do | 1K |
| 61, 67 | do | 620 |
| 66 | do | 2K |
| Capacitor: | | |
| 44 | μμf | 47 |
| 56 | μμf | 33 |

Diodes 49, 50, 51, 55, 65 are semiconductor diodes Transitron Type T6G. Transistors 21 and 31 are Philco MAD T (Micro-Alloy Drift transistors).

Using the above tabulated values the subject circuit was operated at a 5 megacycle rate using a 50% duty factor input signal. While the circuit as described utilizes PNP transistors, it can readily be adapted to use NPN transistors merely by changing the power supply and bias networks to be consistent with NPN transistors, since PNP and NPN are essentially complements of each other. Using NPN transistors, a positive input transition would represent the pertinent input, i.e., A or B, while a positive output signal would indicate the Exclusive Or function.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the invention therefore, to be limited only as indicated by the scope of the following claims.

What is claimed is:

1. An "Exclusive Or" logical circuit comprising first and second transistors having base, collector and emitter elements, said first transistor being connected in grounded emitter configuration, said second transistor being connected in emitter follower configuration, said transistors having an input and an output circuit, said input circuit including a plurality of input terminals for applying said input variables thereto, means connecting said input circuit to the base of said first transistor and the collector of said second transistor, means connecting the collector of said first transistor to the base of said second transistor, said last-mentioned means including means for biasing said second transistor into the active region of operation in response to the conduction of said first transistor, and into the saturation region of operation in response to the cut off of conduction of said first transistor and means connecting the emitter of said second transistor to said output circuit whereby an output signal is provided having a signal level approaching the level of the base of said second transistor when said second transistor is in said active region, and having a signal level approaching the signal level of the collector of said second transistor when said second transistor is in said saturation region.

2. An "Exclusive Or" logical circuit comprising first and second transistors having base, collector and emitter elements, said first transistor being connected in grounded emitter configuration, said second transistor being connected in emitter follower configuration, said transistors having an input and an output circuit, said input circuit including first and second input terminals for applying first and second input signals to said logical circuit, coincidence circuit means interconnected between said input terminals and the base of said first transistor, means interconnected between said input terminals and the collector of said second transistor, means connecting the collector of said first transistor to the base of said second transistor, said last-mentioned means including means for biasing said second transistor into the active region of operation in response to the conduction of said first transistor, and into the saturation region of operation in response to the cut off of conduction of said first transistor and means coupling the emitter of said second transistor to said output circuit whereby an output signal is provided having a signal level approaching the level of the base of said second transistor when said second transistor is in said active region, and having a signal level approaching the signal level of the collector of said second transistor when said second transistor is in said saturation region.

3. A device of the character described in claim 2 wherein said means connecting said input terminals to the collector of said second transistor includes a pair of asymmetric conducting devices.

References Cited in the file of this patent

UNITED STATES PATENTS

| | | |
|---|---|---|
| 2,673,936 | Harris | Mar. 30, 1954 |
| 2,723,355 | Graham | Nov. 8, 1955 |
| 2,842,682 | Clapper | July 8, 1958 |
| 2,850,647 | Fleisher | Sept. 2, 1958 |
| 2,889,467 | Endres et al. | June 2, 1959 |
| 2,986,652 | Eachus | May 30, 1961 |
| 2,986,654 | Gunning | May 30, 1961 |

OTHER REFERENCES

Pub. I, Richards, "Digital Computer Components and Circuits," D. Van Nostrand, New York, N.Y., 1957, pp. 38, 39, 153, 49, and 54 relied on.